United States Patent
Kondareddy

(10) Patent No.: US 11,632,766 B2
(45) Date of Patent: Apr. 18, 2023

(54) DEVICES, SYSTEMS AND METHODS FOR DYNAMICALLY ALLOCATING PORTIONS OF CHANNELS TO DIFFERENT COMMUNICATION PROTOCOLS

(71) Applicant: Cypress Semiconductor Corporation, San Jose, CA (US)

(72) Inventor: Raghunatha Kondareddy, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 32 days.

(21) Appl. No.: 16/443,503

(22) Filed: Jun. 17, 2019

(65) Prior Publication Data

US 2020/0396746 A1    Dec. 17, 2020

(51) Int. Cl.
| | |
|---|---|
| *H04W 72/08* | (2009.01) |
| *H04W 4/80* | (2018.01) |
| *H04L 1/20* | (2006.01) |
| *H04W 72/04* | (2009.01) |
| *H04W 72/0453* | (2023.01) |
| *H04W 84/12* | (2009.01) |

(52) U.S. Cl.
CPC ......... *H04W 72/087* (2013.01); *H04L 1/203* (2013.01); *H04W 4/80* (2018.02); *H04W 72/0453* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2009/0111496 A1* | 4/2009 | Ibrahim | H04W 72/085 455/512 |
| 2009/0247217 A1* | 10/2009 | Hsu | H04W 88/06 455/553.1 |
| 2009/0258607 A1* | 10/2009 | Beninghaus | H04B 1/3805 455/77 |
| 2011/0090939 A1 | 4/2011 | Diener et al. | |
| 2011/0125905 A1 | 5/2011 | Baucke et al. | |
| 2011/0237188 A1* | 9/2011 | Sen | H04B 17/382 455/41.2 |
| 2015/0043456 A1 | 2/2015 | Rikkinen et al. | |
| 2016/0234855 A1 | 8/2016 | Panteleev et al. | |
| 2016/0330058 A1 | 11/2016 | Chen et al. | |
| 2017/0303275 A1 | 10/2017 | Banerjea et al. | |
| 2017/0367058 A1 | 12/2017 | Pelletier et al. | |
| 2019/0150189 A1* | 5/2019 | Ghosh | H04W 80/02 370/329 |

OTHER PUBLICATIONS

International Search Report for International application No. PCT/US2020/036173 dated Sep. 9, 2020, 2 pages.
Written Opinion of the International Searching Authority for International application No. PCT/US2020/036173 dated Sep. 9, 2020, 5 pages.

* cited by examiner

*Primary Examiner* — Hong Shao

(57) ABSTRACT

A method can include selecting a channel from a network operating according to a first protocol (e.g., an IEEE 802.11ax channel). Designating at least one portion of the channel as a shared resource unit (RU) and another portion as a dedicated RU. When an associated device is communicating according to a different protocol (e.g., a Bluetooth standard), allocating frequencies of the shared RU for use by the associated device and allocating the dedicated RUs for use by the network operating according to the first protocol.

17 Claims, 10 Drawing Sheets

(BACKGROUND)

US 11,632,766 B2

DEVICES, SYSTEMS AND METHODS FOR DYNAMICALLY ALLOCATING PORTIONS OF CHANNELS TO DIFFERENT COMMUNICATION PROTOCOLS

TECHNICAL FIELD

The present disclosure relates generally to wireless systems, and more particularly to wireless systems having collocated devices that can communicate according to different protocols that can share a bandwidth.

BACKGROUND

FIG. 11 is a diagram showing the allocation of bandwidth between collocated devices according to a conventional approach. One device can operate according to a 2.4 GHz IEEE 802.11 standard (WLAN 2.4) while the other device can operate according to a Bluetooth (BT) Standard and/or BT Low Energy Standard (BT/BLE). WLAN 2.4 can operate on a number of different overlapping 22 MHz channels, shown as CH1 to CH14. CH1 at one end of the WLAN spectrum can have a center frequency of 2.412 GHz. CH14 at the other end of the WLAN spectrum can have a center frequency of 2.484 GHz. BT/BLE can adaptively frequency hop (AFH) between 2.402 GHz and 2.481 GHz on 1 or 2 MHz channels. Accordingly, channels CH1 to CH14 can overlap BT/BLE channels. As a result, WLAN 2.4 channels can interfere with BT/BLE operations.

For example, as shown in FIG. 11, if a WLAN 2.4 device is operating on channel CH9, it can interfere with a corresponding range of the BT/BLE spectrum (shown as UNAVAILABLE). As a result, BT/BLE operations can exclude the bands corresponding to CH9, restricting the number of channels for AFH operations. This can reduce the performance of BT/BLE operations.

Further, while FIG. 11 shows 20 MHz IEEE 802.11 channels, WLAN can also divide a spectrum into 40 MHz channels. In such cases, the use of one WLAN channel can interfere with a large number of BT/BLE channels, greatly restricting BT/BLE operations.

It would be desirable to arrive at some way of improving the availability of transmission spectra for collocated devices that have overlapping transmission spectra.

DETAILED DESCRIPTION

Figures 1A, 1B, 2:
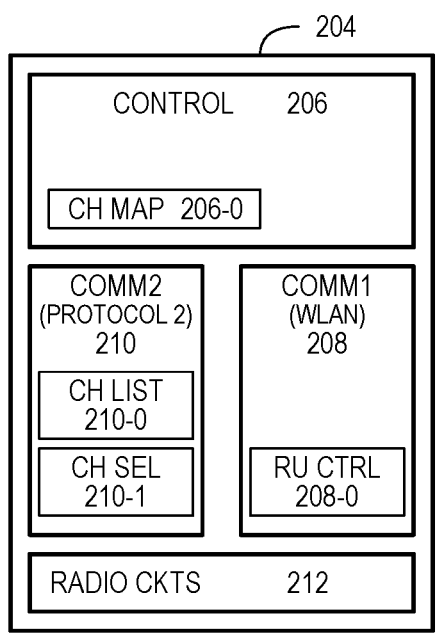
FIGS. 1A and 1B are diagrams showing the allocation of resource units (RUs) according to an embodiment.
FIG. 2 is a block diagram of a system according to an embodiment.

According to embodiments, systems and devices can operate according to different wireless protocols having overlapping bandwidths. A first protocol can include a number of channels, each divisible into multiple portions, or Resource Units (RUs). RUs can be designated as "shared" RUs which can be used by both protocols. For example, when a second protocol is active, the frequencies of a shared RU can be available for transmissions according to the second protocol, but not available for transmissions according to the first protocol. However, when the second protocol is not active, the RU can return for use by the first protocol.

In some embodiments, systems and devices can include first circuits operating according to the IEEE 802.11ax standard and second circuits operating according to a second, different protocol. The second protocol can support shorter range transmissions than the IEEE 802.11ax standard. The IEEE 802.11ax channels can be divided into two or more RUs, which can be designated as shared RUs or non-shared RUs. While operations are occurring according to the second protocol, the shared RU is excluded from use by IEEE 802.11ax operations. However, when second protocol operations have ended, the shared RU can be used for IEEE 802.11ax operations. In some embodiments, RUs may also be non-shared. Non-shared RUs can be excluded from second protocol operations.

In some embodiments, a device can include collocated IEEE 802.11ax and Bluetooth (BT/BLE) circuits. RUs of channels can be designated as shared RUs. When BT/BLE circuits are active, they can have access to BT/BLE channels within the shared RU. However, when BT/BLE circuits are not active, the shared RU can be used by the IEEE 802.11ax circuits.

In the various embodiments below, like items are referred to by the same reference characters, but with the leading digit(s) corresponding to the figure number.

FIGS. 1A and 1B are a diagrams showing RU sharing according to an embodiment. It is assumed that the bandwidth of the channel 100A/B can be shared by two different protocols. A channel 100A/B can occupy a range of frequencies and can be divided into a number of RUs 102. Each different RU can enable communication with a separate device. In the embodiment shown, channel 100A can be divided into four RUs 102, but this should not be construed as limiting. A channel 100A/B could be divided into a fewer or greater number of RUs according to the communication standards/protocols being used.

FIG. 1A shows RU allocation when a first protocol is active, but the second protocol is not active. Because the second protocol is not active, all RUs 102 can be allocated to the first protocol (shown as WLAN).

FIG. 1B shows RU allocation when a first protocol is active, but the second protocol is active. In FIG. 1B it is assumed that RUs labeled RU1 and RU2 have been designated as shared RUs 102'. The frequencies of such shared RUs 102' are available for use by the second protocol but excluded for use by the first protocol.

In some embodiments, a first protocol can be operated according to the IEEE 802.11ax standard. A second protocol can be any suitable protocol. In some embodiments, a second protocol can support a shorter transmission range than the IEEE 802.11ax standard. In particular embodiments, a second protocol can be operations according to a BT/BLE standard.

FIG. 2 is a block diagram of a combination system 204 according to an embodiment. A combination system 204 can include different communication circuits collocated in a same system. A combination system 204 can include control circuits 206, first communication circuits 208, second communication circuits 210, and radio circuits 212. First communication circuits 208 can be wireless communication circuits compatible with a first protocol. First communication circuits 208 can include an RU control section 208-0, which can control when RUs are not available for first communication circuits 204 when communicating according to the first protocol.

Second communication circuits 210 can be wireless communication circuits compatible with a second protocol. Second communication circuits 210 can be associated with first communication circuits 208. Second communication circuits 210 can include a channel list 210-0 and channel selector 210-1. A channel list 210-0 can be a list of channels used in a second communication protocol. It is understood that channels of the second protocol are not the same as channels of the first protocol. Channel selector 210-1 can select channels from the channel list 210-0 during communications according to the second protocol. It is understood that in other embodiments second communication circuits 210 can be located remotely from first communication circuits 208.

Control circuits 206 can provide control signals to first and second communication circuits 208 and 210. Control circuits 206 can include a channel map 206-0 which includes data correlating channels of a first protocol to those of a second protocol. Control circuits 206 can control operations between first and second communication circuits 208 and 210. For example, control circuits 206 can indicate to first communication circuits 208 when second communication circuits 210 are active, resulting in second communication circuits 208 excluding shared RUs from use. Further, control circuits 206 can also indicate to second communication circuits 210 when channels should not be used, based on channels used by first communication circuits 208.

Radio circuits 212 can transmit data according to the first and second protocols. In particular embodiments, radio circuits 212 can enable the first and second communication circuits to share a common band (e.g., 2.4 GHz).

In particular embodiments, first communication circuits 208 can be IEEE 802.11ax compatible circuits and second communication circuits 210 can be BT/BLE compatible circuits.

Figures 3A, 3B, 3C:
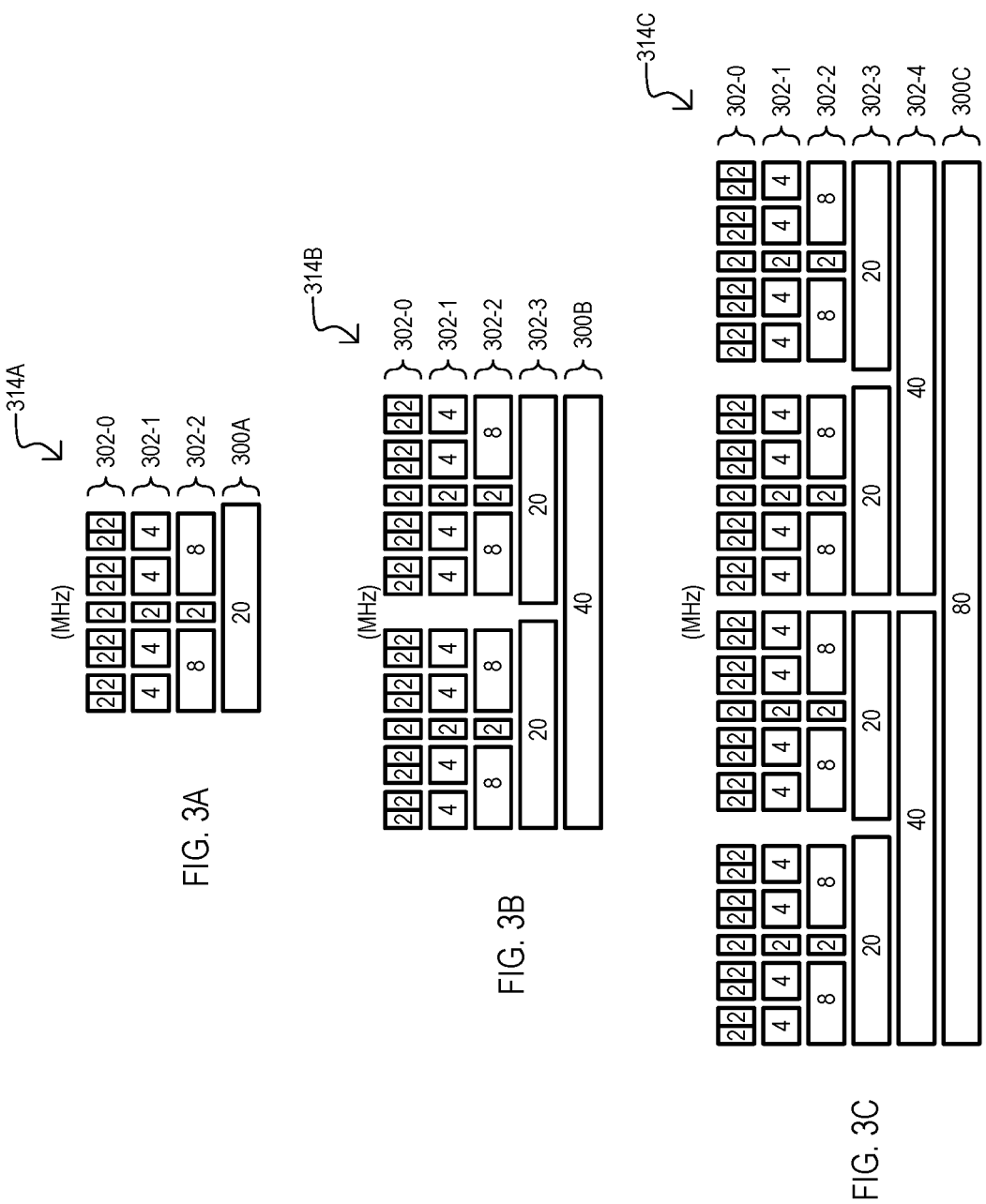
FIGS. 3A to 3C are diagrams showing RUs that can be allocated according to embodiments.

FIGS. 3A to 3C are diagrams showing channel divisions that can be included in embodiments. FIG. 3A shows a first channel-RU arrangement. A channel 300A can have a bandwidth of about 20 MHz and can be subdivided into RUs of various sizes. Example 302-0 shows nine RUs, each of about 2 MHz. Example 302-1 shows four RUs of about 4 MHz and one of about 2 MHz. Example 302-2 shows two RUs of about 8 MHz and one of about 2 MHz. It is understood, the various RUs could be mixed (e.g., one 8 MHz RU, one two MHz RU, and two 4 MHz RUs).

FIG. 3B shows divisions for a channel 300B of about 40 MHz. The RU sizes are understood from the descriptions of FIG. 3A. In FIG. 3B, as shown by example 302-3 a channel division can include one or two 20 MHz RUs.

FIG. 3C shows divisions for a channel 300C of about 80 MHz and can include RUs of the sizes shown in FIG. 3B, as well as RUs of 40 MHz.

According to embodiments, a system can include a protocol which can select a channel (300A, 300B, 300C). The selected channel can be divided into different RUs, as understood from FIGS. 3A to 3C. It is understood that any or all RUs can overlap with the bandwidth of another protocol. Any such overlapping RU can be selectively designated as a shared RU. When the second protocol is active, frequencies of the shared RU are not used by the first protocol, and thus made available for the second protocol. In addition, some RUs can be designated as non-shared RUs. The frequencies of non-shared RUs can be excluded from use by the second protocol.

In particular embodiments, channels (300A, 300B, 300C) and RUs (302-0 to -4) can be those specified in the IEEE 802.11ax standard.

Figure 4A:
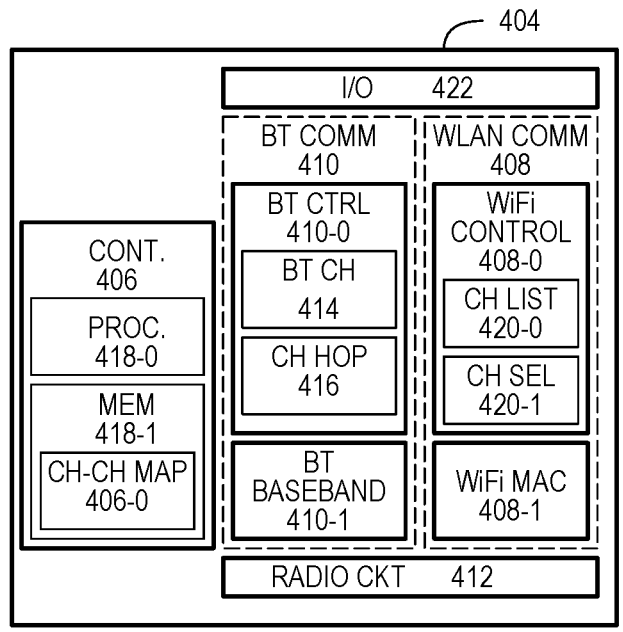
FIG. 4A is a block diagram of a combination Bluetooth (BT)—WLAN device according to an embodiment.

FIG. 4A is a block diagram of a combination device 404 according to another embodiment. In some embodiments, combination device 404 can be one particular implementation of the system shown in FIG. 2 as 204. A combination device 404 can include WLAN communication circuits 408, BT communication circuits 410, controller 406, radio circuits 412, and input/output (I/O) circuits 422. BT communication circuits 410 can be circuits compatible with a BT standard, and can include BT control circuits 410-0 and BT baseband circuits 410-1. BT communication circuits 410 can operate in a 2.4 GHz band. BT control circuits 410-0 can control BT operations, including the formation and transmission of BT packets. BT control circuits 410-0 can include a channel list 414 and channel hop control 416. Channel hop control 416 can control which channels are used in an adaptive frequency hopping (AFH) operation during BT transmissions. Channel list 414 can include information on BT channels, and can indicate which BT channels can be included and which channels can be excluded from AFH operations.

WLAN communication circuits 408 can be WLAN circuits that can operate according to the IEEE 802.11ax and possibly other IEEE 802.11 standards. WLAN communication circuits 408 can include WiFi control circuit 408-0 and WiFi media access control (MAC) circuits 408-1. WLAN circuits can operate in the 2.4 GHz band, and optionally, other IEEE 802.11 bands (e.g., 5 GHz, 6 GHz). WiFi control circuit 408-0 can include a channel list 420-0 and channel selection section 420-1 for selecting channels for WLAN communications. Channel list 420-0 can include channels available for WLAN transmission, including those for use in the 2.4 GHz band (which can overlap BT channels). Channel list 420-0 can also track RUs of selected channels, including how the RUs are allocated, as described for other embodiments herein and equivalents (i.e., available for BT use or not).

Controller circuits 406 can control operations of a combination device 404, including determining when BT communication circuits 410 are active, and relaying such information to WLAN communication circuits 408. In response, WLAN communication circuits 408 can exclude RUs designated as shared RUs from WLAN operations. In some embodiment, controller circuits 406 can include channel-to-channel map data 406-0, to determine [s]how BT channels map to WLAN channels and vice versa. In some embodiments, controller circuits 406 can indicate to BT communication circuits 410 BT channels to be excluded (e.g., BT channels corresponding to a WLAN RU that is not to be shared). In response, BT control communication circuits 410 can update channel list 414 accordingly. In the embodiment shown, controller circuits 406 can include one or more processors 418-0 and a memory system 418-1. However, any other suitable circuits could be employed, including application specific logic, both fixed or programmable.

Radio circuits 412 can take the form of any of those described herein or equivalents.

I/O circuits 422 can enable control of combination device 404 from sources external to the combination device 404. I/O circuits 422 can include circuits that enable communication with the combination device 404 according to any suitable method. Such methods can include any of various serial data communication standards/methods including but not limited to: serial digital interface (SDI), universal serial bus (USB), universal asynchronous receiver transmitter (UART), I$^2$C, or I$^2$S.

Figure 4B:
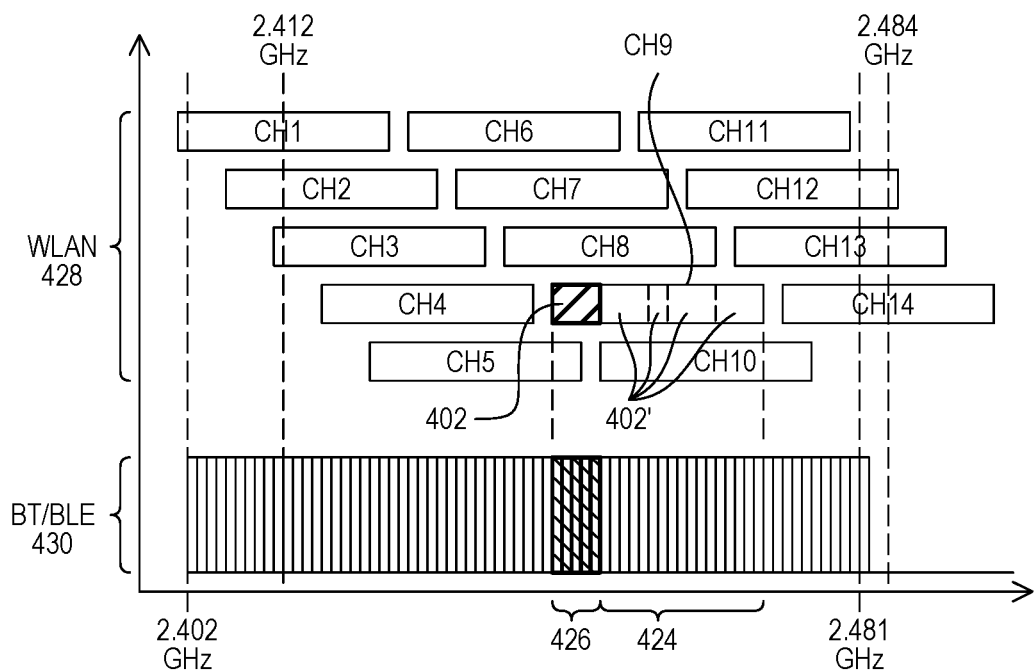
FIG. 4B is a diagram showing allocation of RUs according to another embodiment.

FIG. 4B is a diagram showing operations according to an embodiment. Such operations can be executed by the systems devices shown herein, and equivalents. FIG. 4B is a timing diagram showing WLAN channels 428 and BT/BLE channels 430. WLAN channels 428 can be 20 MHz channels according to the IEEE 802.11ax standard, and so are divisible into RUs. Further, such RUs can be designated as shared RUs as described herein and equivalents. BT/BLE channels 430 can overlap various WLAN channels 428.

FIG. 4B shows one particular configuration in which WLAN channel 9 (CH9) can have five RUs (e.g., four 4 MHz RUs and one 2 MHz RU). Four RUs can be designated as shared RUs 402'. Consequently, during BT/BLE operations, the corresponding BT/BLE channels, shown as 424, can be unavailable for WLAN operations but available for BT/BLE operations. In the embodiment shown, RU 402 is designated as not shared (i.e., dedicated to WLAN), thus the corresponding BT/BLE channels, shown as 426, can be excluded from BT/BLE operations.

It is understood that any of the channels shown in FIG. 4B can have RUs of any suitable size designated as shared RUs or dedicated RUs (not for BT/BLE use). Further, while FIG. 4B shows a 20 MHz channels, the same operations can occur for channels of any other size (e.g., 40 MHz, as shown in FIG. 3B or 80 MHz, as shown in FIG. 3C).

Figure 5:
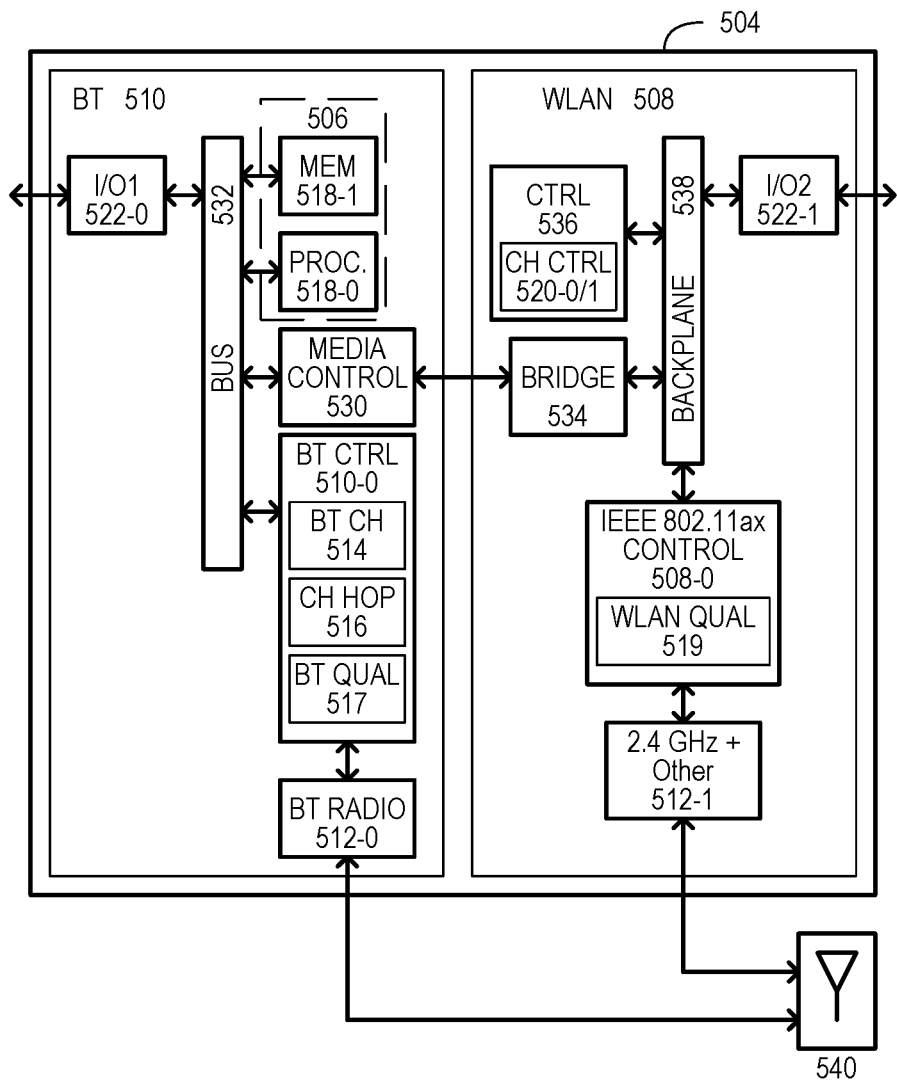
FIG. 5 is a block diagram of a combination Bluetooth (BT)—WLAN device according to another embodiment.

FIG. 5 is a block diagram of a combination device 504 according to another embodiment. In some embodiments, combination device 504 can be one particular implementation of either of those shown as FIG. 2 or 4A. A combination device 504 can include a BT section 510 and a WLAN section 508. A BT section 510 can include a controller 506, BT control circuits 510-0, media control circuit 530, and first I/O circuits 522-0 in communication with one another over a bus 532. A controller 506 can control operations of combination device 504, including operations within WLAN section 508. In some embodiments, a controller 506 can issue control signals over bus 532 that can be transmitted to WLAN section 508 over bridge 534 via media control circuits 530. A controller 506 can include one or more processors 518-0 and a memory system 518-1. A controller 506 can designate an RU as a shared RU or dedicated RU, as described herein and equivalents. A controller 506 can also indicate to WLAN section 508 when a BT section 510 is, or will be, active. This can enable WLAN section 508 to exclude shared RUs from WLAN operations in response to such indications.

BT control circuits 510-0 can include circuits for performing functions according to one or more BT standards, including determining BT channels 514 and controlling channel hopping 516 among the BT channels. BT control circuits 510-0 can also include channel quality circuits 517. Channel quality circuits 517 can determine a quality of BT channels. Based on such quality data, BT channel can be excluded from an AFH operation. In particular embodiments, quality data can include a bit error rate for each channel. BT control circuits 510-0 can control BT radio 512-0 to operate according to one or more BT protocols.

Media control circuits 530 can communicate with WLAN section 508 over bridge 534 to coordinate communications between BT and WLAN sections (510, 508), including messages to WLAN section 508 that indicate when BT circuits are/will be active. First I/O circuits 522-0 can enable communication with the combination device 504 according to any of the embodiments described herein or equivalents.

A WLAN section 508 can include IEEE 802.11ax circuits 508-0, bridge control circuit 534, WLAN control circuits 536, and second I/O circuits 522-1 in communication with one another over a backplane 538. IEEE 802.11ax circuits 508-0 can include circuits for performing functions according to the IEEE 802.11ax standard, as well as other IEEE 802.11 standards. As such, IEEE 802.11ax circuits 508-0 can divide channels into RUs using Orthogonal Frequency-Division Multiple Access (OFDMA). IEEE 802.11ax circuits 508-0 can also include WLAN quality circuits 519, which can determine a quality of IEEE 802.11ax with respect to IEEE 802.11ax transmissions.

Multi-band radio circuits 512-1 can transmit and receive data on one or more WLAN bands (e.g., 2.4 GHz, 5 GHz). Media control circuit 530 can control data transfer operations between BT section 510 and WLAN section 508 over bridge 534, including indicating channels selection and/or RU configurations. Second I/O circuits 522-1 can enable communication with the combination device 504 according to any of the embodiments described herein or equivalents, including communications with BT section 510 over bridge 534. WLAN control circuits 536 can include channel control circuits 520-0/1 which can determine which channels are available for use by WLAN section 508.

A combination device 504 can also include an antenna system 540 connected to BT radio circuits 512-0 and multi-band radio circuits 512-1. Antenna system 540 can include one or more physical antennas, as well as switches for enabling different connections to such antennas.

Figure 6:
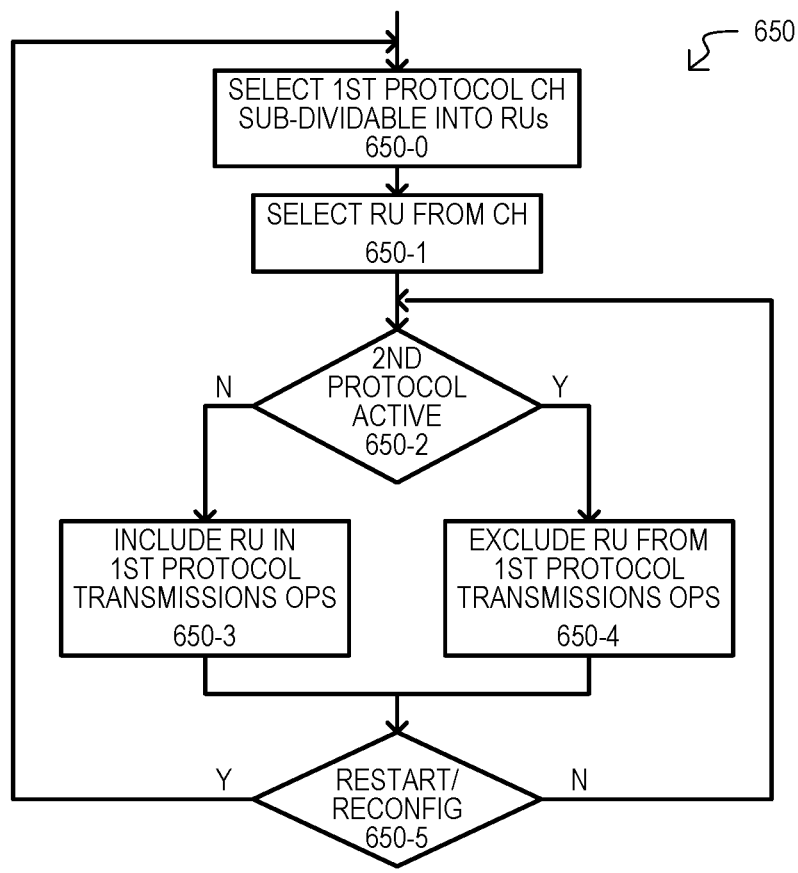
FIG. 6 is a flow diagram of a method according to an embodiment.

FIG. 6 is a flow diagram of method 650 for controlling RUs according to an embodiment. A method 650 can include selecting a first protocol channel that is sub-dividable 650-0. Such an action can include selecting a channel from a number of channels, each channel spanning a range of frequencies used by a protocol for communicating between two devices. The selected channel is dividable into portions (e.g., RUs), but method 650 should not be construed as being limited to any particular protocol. An RU can be selected for the channel 650-1. Such an action can include selecting the RU according to any suitable criteria.

If a second protocol is not active (N from 650-2), a method 650 can include the selected RU in transmissions according to the first protocol 650-3. In contrast, if the second protocol is active (Y from 650-2), a method 650 can exclude the selected RU from transmissions according to the first protocol 650-3. Thus, frequencies of the RU can be available for transmissions according to the second protocol.

In the embodiment shown, if there is a restart, re-configuration or similar action (Y from 650-5) a method 650 can return to 650-0. Otherwise, a method 650 can return to 650-2.

Figure 7:
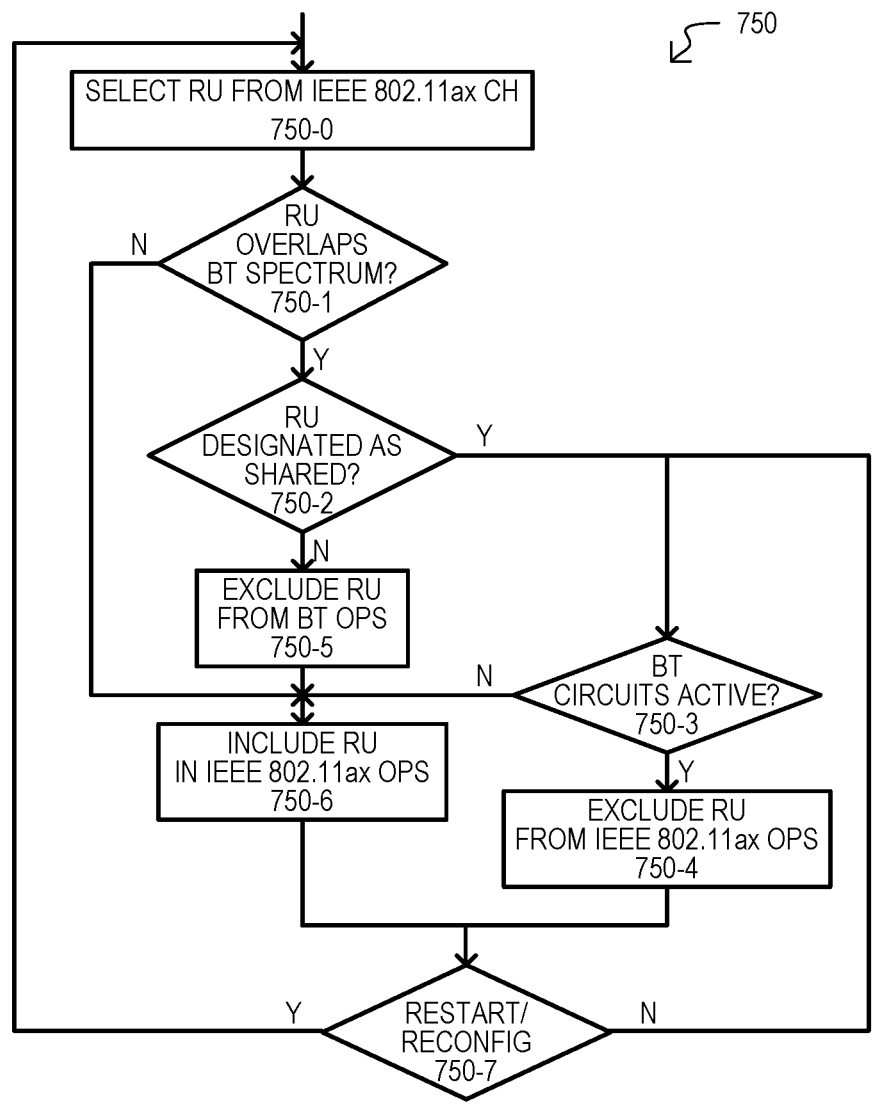
FIG. 7 is a flow diagram of a method according to another embodiment.

FIG. 7 is a flow diagram of method 750 for controlling RUs according to another embodiment. A method can include selecting an RU from an IEEE 802.11ax channel

750-0. A method 750 can determine if the selected RU overlaps a BT spectrum 750-1. Such an action can include determining if the RU overlaps the BT spectrum as indicated by a BT standard. However, such an action can also include determining if the RU overlaps a BT spectrum as modified by a device. That is, a BT spectrum may have already been modified to discard some BT channels due other criteria, such as bit error rate. This can result in a modified BT spectrum having fewer channels than that dictated by a standard. If an RU is composed of BT channels already determined as undesirable, the RU may not be selected as a shared RU.

If the selected RU is determined to overlap a BT spectrum (Y from 750-1), a method 750 can designate, or not designate, the RU as a shared RU 750-2. Such an action can include making such a determination based on any suitable method. As but one example, a quality of communications using frequencies of the RU can be used. However, in some embodiments, a method 750 may not include an action 750-2 (i.e., a selected RU can be automatically designated as a shared RU).

If an RU is designated as a shared RU (Y from 750-2) a method 750 can determine if BT circuits are active 750-3. Such an action can include determining if BT circuits are, or will be, transmitting and/or receiving over the BT spectrum, including portions that overlap the shared RU. If BT circuits are determined to be active (Y from 750-3), the selected RU can be excluded from IEEE 802.11ax operations 750-4. If BT circuits are not active (N from 750-3) a method 750 can include the selected RU in IEEE 802.11ax operations 750-6.

If an RU is not designated as a shared RU (N from 750-2), the RU can be excluded from BT operations 750-5. Such an action can include removing those BT channels corresponding to the selected RU from a BT channel hopping sequence. A method 750 then include the selected RU in IEEE 802.11ax operations 750-6.

In the embodiment shown, if there is a restart, re-configuration or other such action (Y from 750-7) a method 750 can return to 750-0. Otherwise, a method 750 can return to 750-3.

While embodiments can include the automatic designation of an RU as a shared RU, in some embodiment RUs can be selected based on quality determinations of WLAN and/or BT channels. One such embodiment is shown FIG. 8.

Figure 8:
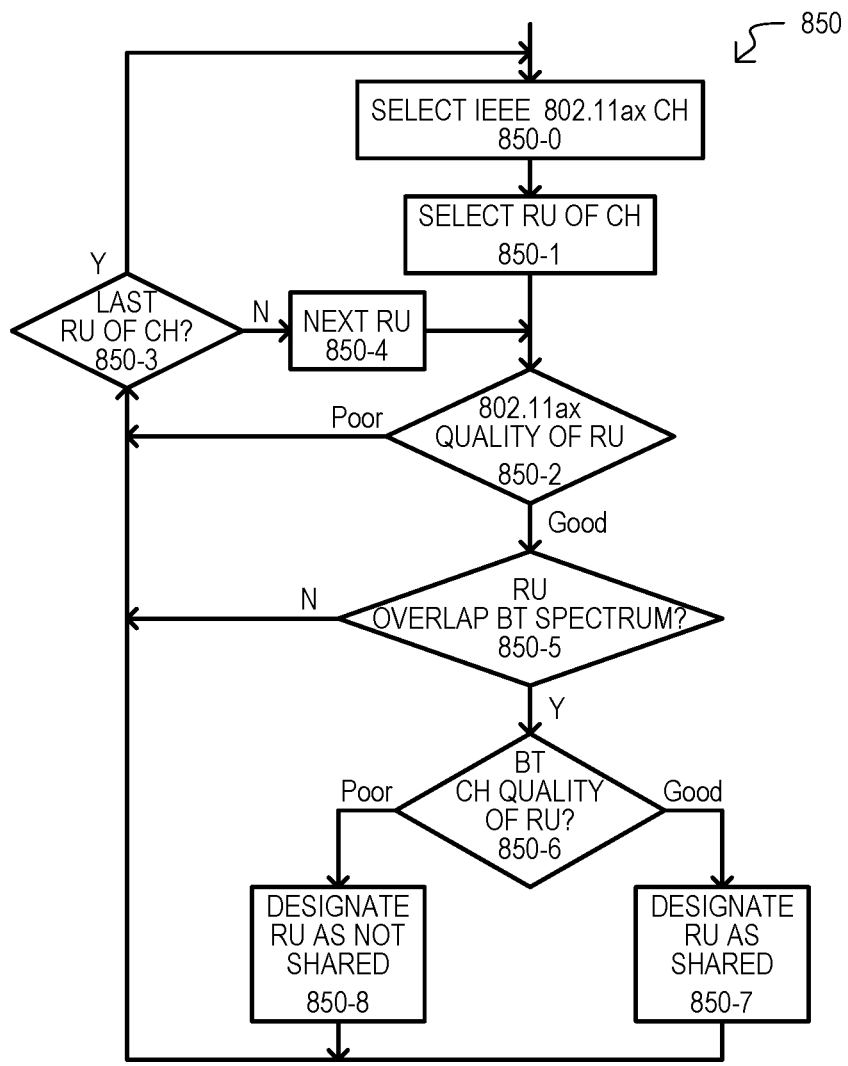
FIG. 8 is a flow diagram of a method according to another embodiment.

FIG. 8 is a flow diagram of method 850 according to another embodiment. A method 850 can include selecting an IEEE 802.11ax channel 850-0. One of multiple RUs of the channel can then be selected 850-1. If the 802.11ax quality of the RU is above a predetermined level (Good from 850-2), a method 850 can determine if the RU overlaps a BT spectrum 850-5. If the selected RU overlaps the BT spectrum (Y from 850-5), a quality determination for BT channels of the selected RU can be made 850-6. If BT channels included in the frequencies of the RU are above a predetermined quality level (Good from 850-6), a method 850 can designate the RU as a shared RU 850-7. As a result, the selected RU can be excluded from IEEE 802.11ax operations when BT circuits are active. If BT channels of the RU are below a predetermined level (Poor from 850-6), a method 850 can designate the RU as not shared 850-8. As a result, BT channels corresponding to the not shared RU can be excluded from BT operations.

Once an RU has, or has not, been designated as a shared RU, a method 850 can determine if a last RU of the channel has been checked 850-3. If a last RU of the channel has not been checked (N from 850-3), a method 850 can proceed to a next RU of the channel 850-4, and the various quality determinations can be repeated.

If an IEEE 802.11ax quality of the selected RU is below a predetermined level (Poor from 850-2) or the RU does not overlap a BT spectrum (N from 850-5), a method 850 can proceed to 850-3.

Figure 9A:
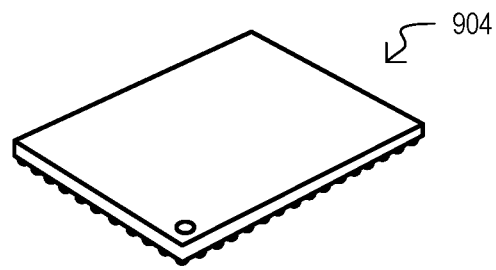
FIG. 9A is a diagram of a combination device according to an embodiment.

While embodiments can include systems with various interconnected components, embodiments can include unitary devices which can selectively exclude RUs (i.e., portions of channels) used in operations of one protocol while another protocol is active. Such unitary devices can be advantageously compact single integrated circuits (i.e., chips). FIG. 9A show one particular example of a packaged single chip combination device 904. However, it is understood that a combination device according to embodiments can include any other suitable integrated circuit packaging type, as well as direct bonding of a combination device chip onto a circuit board or substrate.

While embodiments can include compact systems, such as integrated circuit packages, embodiments can also include systems employing multiple devices on multiple networks, with such networks operating according to a different protocol. One such embodiment is shown in FIG. 9B.

Figure 9B:
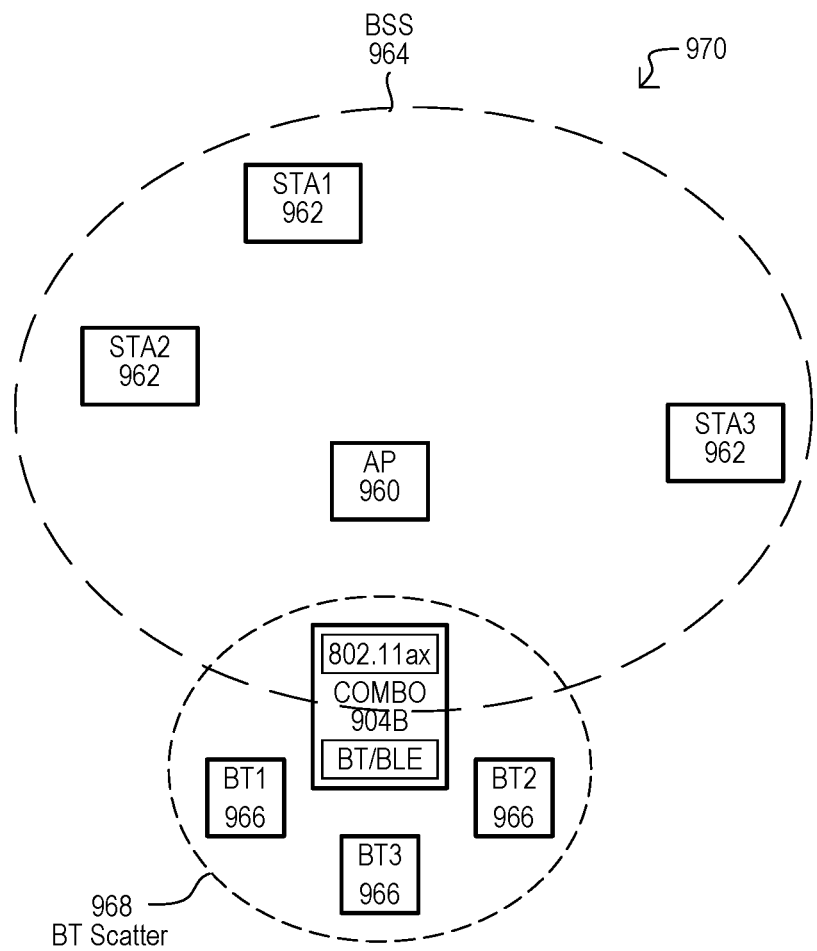
FIG. 9B is a diagram of a system according to an embodiment.

FIG. 9B is a diagram showing a system 970 according to another embodiment. A system 970 can include a combination device 904B, other WLAN devices, including an Access Point (AP) 960 and stations (STA) 962, and other BT devices 966. A combination device 904B can include BT circuits (BT/BLE) and IEEE 802.11ax compatible circuits (shown as 802.11ax).

Combination device 904B and WLAN devices (960, 962) can form a Basic Service Set (BSS) 964 and can communicate with another according to the IEEE 802.11ax standard. Combination device 904B and other BT devices 966 can form a BT piconet 968 and communicate with one another according to a BT standard.

According to any of the embodiments disclosed herein, and equivalents, a combination device 904B can selectively exclude RUs from transmission on BSS 964 when BT/BLE circuits are active.

It is noted that while BSS 964 is shown with an AP 960, in other embodiments, a combination device 904B could be an AP. Similarly, combination device 904B can operate as a slave and/or master in piconet 968. In addition, while combination device 904B can allocate RUs for BT/BLE circuits, in addition or alternatively, combination device 904B can allocate RUs for other BT devices 966. That is, a device associated with 802.11ax circuits can be BT/BLE circuits of a combination device and/or any or all of BT devices 966.

Figure 10A:
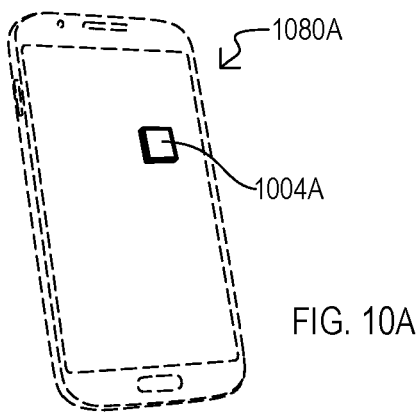
FIGS. 10A to 10D are diagrams of systems according to other embodiments.

Referring to FIGS. 10A to 10D, various other systems according to embodiments are shown in series of diagrams. FIG. 10A shows a handheld computing device 1080A. Handheld computing device 1080A can include a combination device 1004A that can selectively exclude RUs of one protocol when another protocol is active.

Figure 10B:
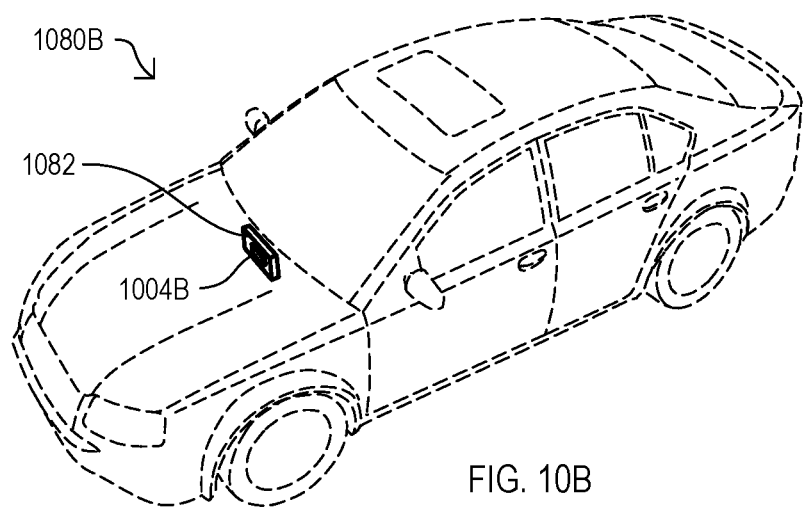

FIG. 10B shows an automobile 1080B according to an embodiment. Automobile 1080B can have numerous subsystems, including a communication subsystem 1082. In some embodiments, a communication subsystem 1082 can enable an automobile to provide WiFi communications as well as enable other devices to pair to the system via Bluetooth. Communication subsystem 1082 can include a combination device 1004B as described herein, or equivalents, serving as an access point, or part of an access point. In such an arrangement, combination device 1004B can provide greater reliability for Bluetooth communications by selectively excluding possibly interfering RUs when Bluetooth communications are active.

Figure 10C:
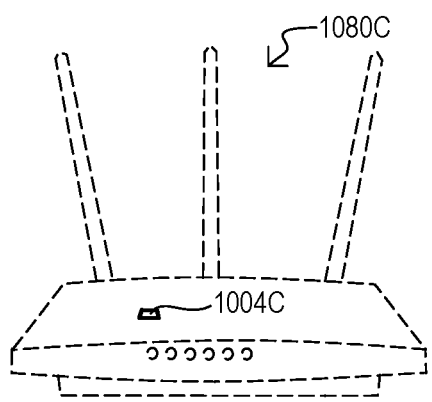

FIG. 10C shows a router device 1080C. Router device 1080C can provide routing functions according to an IEEE 802.11ax protocol, while also enabling access via a closer range protocol (e.g., Bluetooth). Router device 1080C can include a combination device 1004C as described herein, or equivalents.

Figure 10D:
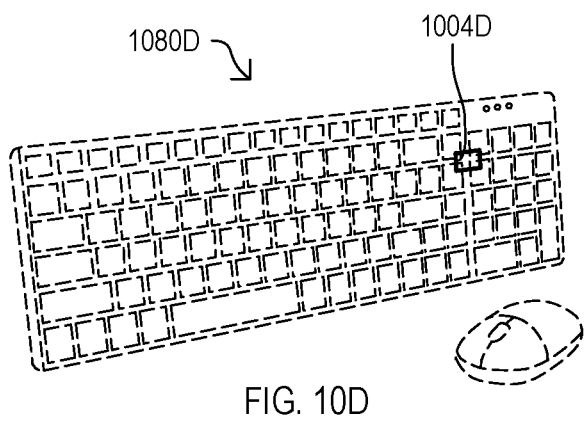
Figure 11:
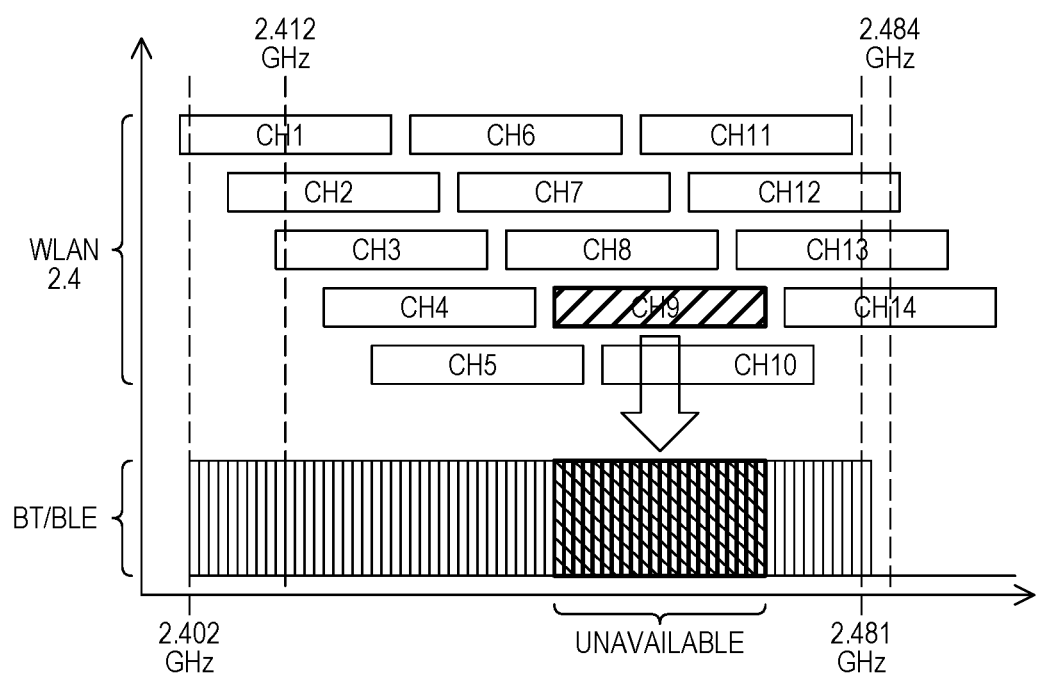
FIG. 11 is a diagram showing conventional WLAN and BT channels.

FIG. 10D shows a human interface device (HID) 1080D. HID 1080D can enable a person to interact or control other devices and should not be construed as limited to any particular HID. As but a few of many possible examples, HID 1080D can control a computing system, manufacturing equipment or other systems. HID 1080D can include a combination device 1004D as described herein, or equivalents.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
    selecting at least one resource unit (RU) from a channel in an IEEE 802.11ax compatible network based on quality indications for frequencies of the at least one RU, the channel overlapping a Bluetooth (BT) transmission spectrum;
    designating the at least one RU as a shared RU and at least one other RU of the same channel as a dedicated RU; and
    when an associated BT device is communicating, allocating frequencies of the shared RU for use by the associated BT device, excluding the frequencies of the shared RU for use in the IEEE 802.11ax compatible network, while concurrently allocating the dedicated RU for use by the IEEE 802.11ax compatible network; wherein
    the dedicated RU and the shared RU are RUs as specified by an IEEE 802.11 wireless standard and different portions of the channel, and the channel is a portion of a larger IEEE 802.11 wireless band.

2. The method of claim 1, further including:
    generating the quality indications from a source selected from the group of: the associated BT device and an IEEE 802.11ax compatible device of the IEEE 802.11ax compatible network.

3. The method of claim 1, wherein:
    the selecting of the at least one RU is executed by an integrated circuit device that includes IEEE 802.11ax compatible circuits and the associated BT device.

4. The method of claim 1, further including:
    when the associated BT device is not communicating, allocating the shared RU for use by the IEEE 802.11ax compatible network.

5. The method of claim 1, further including:
    excluding frequencies of the dedicated RU from the transmission spectrum available to the associated BT device.

6. The method of claim 1, further including:
    storing in memory circuits data for IEEE 802.11ax channel RUs that overlap the BT transmission spectrum.

7. A device, comprising:
    control circuits configured to
        designate at least one resource unit (RU) of an IEEE 802.11ax channel as a shared RU based on quality indications for frequencies of the shared RU and designate at least one other RU of the same IEEE 802.11ax channel as a dedicated RU, the channel overlapping a Bluetooth (BT) transmission spectrum, and
        generate a BT active indication in response to BT circuits being active;
    first communication circuits configured to
        transmit and receive data according to the IEEE.802.11ax standard, and
        exclude the frequencies of the shared RU from IEEE.802.11ax communications in response to the BT active indication while concurrently including the dedicated RU in the IEEE.802.11ax communications; and
    BT circuits configured to, when active, transmit and receive data according to at least one BT standard protocol over allocated frequencies that include the shared RU; wherein
    the shared RU and the dedicated RU are RUs as specified by an IEEE 802.11 wireless standard and different portions of the same IEEE 802.11ax channel, and the channel is a portion of a larger IEEE 802.11 wireless band.

8. The device of claim 7, wherein:
    the control circuits, the first communication circuits, and the BT circuits are formed in a same integrated circuit package.

9. The device of claim 7, wherein:
    the control circuits, the first communication circuits and the BT circuits are formed in a same integrated circuit substrate.

10. The device of claim 7, further including:
    memory circuits configured to store information identifying IEEE 802.11ax channel RUs that overlap the BT transmission spectrum.

11. The device of claim 7, wherein:
    the first communication circuits further include evaluation circuits for generating quality data for transmissions on a plurality of RUs that overlap the BT transmission spectrum; and
    the control circuits are configured to designate the shared RU from the plurality of RUs based on at least the quality data.

12. The device of claim 7, wherein:
the BT circuits include BT evaluation circuits for generating BT quality data for BT channels; and
the control circuits are configured to designate the shared RU from the plurality of RUs based on at least the BT quality data.

13. The device of claim 7, wherein:
the BT quality data comprises a bit error rate for the BT channels.

14. A system, comprising:
first protocol circuits configured to communicate according to at least a first communication protocol over allocated frequencies that include a share resource unit (RU), the first communication protocol being different than an IEEE 802.11 standard;
communication circuits configured to
designate at least one RU of an IEEE 802.11ax channel as the shared RU based on quality indications for frequencies of the shared RU and designate at least one other RU of the IEEE 802.11ax channel as a dedicated RU, the channel overlapping a transmission spectrum of the first communication protocol, and
selectively exclude the frequencies of the shared RU from IEEE 802.11ax communications according to activities of the first protocol while concurrently including the dedicated RU in IEEE 802.11ax communications; and
at least one antenna coupled to the first protocol circuits and the communication circuits; wherein
the shared RU and the dedicated RU are RUs as specified by an IEEE 802.11 wireless standard and different portions of the same IEEE 802.11ax channel, and the channel is a portion of a larger IEEE 802.11 wireless band, and the first protocol circuits comprise communication circuits compatible with at least one Bluetooth standard.

15. The system of claim 14, wherein:
the first protocol circuits are configured to include frequencies of the shared RU as frequencies available for the first communication protocol.

16. The system of claim 14, wherein:
the first protocol circuits are configured to exclude frequencies of the dedicated RU as frequencies available for the first communication protocol.

17. The system of claim 14, wherein:
the first protocol circuits, communication circuits, and the at least one antenna are collocated on a same device.

\* \* \* \* \*